United States Patent [19]

Vita

[11] Patent Number: 4,732,080
[45] Date of Patent: Mar. 22, 1988

[54] APPARATUS FOR PREPARING HOT FOOD

[76] Inventor: Lawrence M. Vita, 323 Mola Ave., Fort Lauderdale, Fla. 33301

[21] Appl. No.: 883,986

[22] Filed: Jul. 10, 1986

[51] Int. Cl.$^4$ .......................... A47J 31/00; A47J 37/12
[52] U.S. Cl. ......................................... 99/330; 99/332; 99/373; 99/404; 99/407; 99/410
[58] Field of Search .................. 99/300, 330, 332, 352, 99/359, 360, 368, 373, 407, 410, 404

[56] References Cited

U.S. PATENT DOCUMENTS

| | | | |
|---|---|---|---|
| 1,501,412 | 7/1924 | Ingram | 99/330 |
| 3,340,790 | 9/1967 | Simjian | 99/360 X |
| 3,431,834 | 3/1969 | Keathley et al. | 99/330 X |
| 3,655,411 | 4/1972 | Albright | 99/330 |
| 3,701,313 | 10/1972 | Boggs | 99/330 |
| 4,398,651 | 8/1983 | Kumpfer | 99/359 X |
| 4,412,482 | 11/1983 | Janssen | 99/410 X |
| 4,586,429 | 5/1986 | Hawkins | 99/407 |

Primary Examiner—H. Hampton Hunter
Attorney, Agent, or Firm—Thomas R. Morrison

[57] ABSTRACT

A pre-cooking operation pre-cooks a pasta product for a time substantially less than required to bring it to serving consistency. Pre-cooking is quenched with cold water and a measured weight of the drained product is sealed in a single-serving container with a measured amount of excess water. The pasta absorbs the excess water to achieve a water content approximating that of a freshly cooked pasta. Heating, dispensing a sauce on the pasta and delivering the product to a purchaser are performed in a rapid automatic sequence. Heating is accelerated by jets of hot water entering a strainer containing the pasta. Walls of a heating pot are double-walled with hot water continuously circulating therethrough to further accelerate the heating. The strainer is raised, drained and the pasta is released into a serving container. A serving of sauce, heated in a sealed heat exchanger is dispensed over the pasta. A water jet, optionally followed by an air jet cleans the sauce nozzle after each use.

12 Claims, 6 Drawing Figures

APPARATUS FOR PREPARING HOT FOOD

BACKGROUND OF THE INVENTION

The present invention relates to food preparation apparatus and, more particularly to food preparation apparatus requiring rapid heating of a food product.

The term "fast food" is recognized as an identifier of such foods as hamburgers, chicken and potato chips served in restaurants equipped with apparatus for keeping pre-cooked items warm until served. The public enthusiasm for appetizing foods delivered without substantial delay is evident in the growth of restaurants offering them.

A further development in food dispensing includes machine preparation and delivery of food to a purchaser. Coin-operated machines for preparing hot coffee, tea and hot chocolate from hot water, powdered flavoring and, optionally, dried lightener and sweeter are common. Coin-operated dispensers of snack foods have been in wide use for decades. In addition, coin-operated refrigerated machines for dispensing perishable foods such as, for example, milk and sandwiches are common. When dispensed from such refrigerated machines, sandwiches require heating using, for example, a micro-wave oven before consumption.

Some foods, although extremely popular in other contexts, have not found wide sale in the fast-food, or coin-operated environment. One type of such popular food includes the various types of pastas with, or without sauces. One of the few pasta dispensing systems commonly seen includes manual or coin-operated delivery of a cold, sealed singe-serving can of, for example, a spaghetti. The can is then opened and the contents heated before consumption. Canned pasta lacks the appeal of freshly cooked pasta. In addition, the time required for opening the can and for heating the contents extends over several minutes.

Some manufacturers sell a pasta frozen in its sauce. The frozen mass is thawed and heated to serving temperature before consumption in a conventional oven, on a stovetop, or in a microwave oven. In some cases the manufacturer's instructions recite that the product should be heated to boiling temperature and allowed to cool for about three minutes before eating. When the three-minute cooling time is added to a thawing and heating time of about seven to nine minutes (these times are for microwave heating and thawing, conventional cooking equipment takes longer), it is seen that the 10- to 12-minute elapsed time stretches the definition of fast food. In addition, the resulting product lacks the texture and flavor of a corresponding pasta, freshly prepared and served hot.

In the case of pasta such as, for example, a spaghetti, a conventional sauce has a pungent aroma. If such a sauce is maintained heated in an open vessel, the pungent aroma tends to permeate the area. Such pungent aroma may be unwelcome in some environments. The flavor of the sauce is dissipated by continued open heating. In addition, health considerations and the freshness of the resulting product make it undesirable to heat the sauce in an open vessel.

OBJECTS AND SUMMARY OF THE INVENTION

Accordingly, it is an object of the invention to provide apparatus for preparing a food product that overcomes the drawbacks of the prior art.

It is a further object of the invention to provide apparatus for heating and dispensing a pasta having a texture and flavor comparable to a freshly prepared pasta, served hot.

It is a still further object of the invention to provide apparatus for bringing a pasta to serving temperature in a minimum time.

It is a still further object of the invention to provide rapid heating of a condiment for dispensing on a heated pasta.

It is a still further object of the invention to provide heating and dispensing apparatus for a pasta sauce including means for cleaning a dispensing nozzle after a predetermined number of portions have been dispensed. In the preferred embodiment, the dispensing nozzle is cleaned after dispensing every portion.

It is a still further object of the invention to provide sealed apparatus for heating a fluid condiment whereby an odor of said condiment is retained inside the apparatus except for the odor of a portion of the condiment after it is dispensed.

It is a still further object of the invention to provide apparatus for heating and then draining a precooked pasta and for dispensing a measured amount of a heated sauce on the pasta prior to delivering the product to a consumer.

Briefly stated, the present invention provides a food-preparation technique in which a pre-cooking operation pre-cooks a pasta product for a time substantially less than required to bring it to serving consistency. Pre-cooking is quenched with cold water and a measured weight of the drained product is sealed in a single-serving container with a measured amount of excess water. The pasta absorbs the excess water to achieve a water content approximating that of a freshly cooked pasta. Heating, dispensing a sauce on the pasta and delivering the product to a purchaser are performed in a rapid automatic sequence. Heating is accelerated by jets of hot water entering a strainer containing the pasta. Walls of a heating pot are double-walled with hot water continuously circulating therethrough to further accelerate the heating. The strainer is raised, drained and the pasta is released into a serving container. A serving of sauce, heated in a sealed heat exchanger is dispensed over the pasta. A water jet, optionally followed by an air jet cleans the sauce nozzle after each use.

According to an embodiment of the invention, there is provided a method for pre-cooking a pasta product comprising: boiling the pasta product for a time substantially shorter than a time required to fully cook the pasta product, quenching the pasta product in a cool water, draining the pasta product to remove substantially all free portions of the cool water, portioning the pasta product into at least one container, adding a predetermined amount of water to the at least one container, sealing the at least one container, and the predetermined amount of water being sufficient, when absorbed by the pasta product during storage thereof for raising a water content of the pasta product to a value substantially equal to a water content of a fully cooked pasta product.

According to a feature of the invention, there is provided apparatus for heating a product comprising: a pot, a strainer for containing the product, means for lowering the strainer into the pot, a water-delivery ring in the pot, the water-delivery ring being positioned a substantial distance above a bottom of the pot and having an opening sufficient to permit the strainer to pass at least part-way therethrough, and the water-delivery ring including means for producing inward-directed water jets of hot water for impingement upon and into the strainer whereby the product in the strainer is contacted by the hot water.

According to a further feature of the invention, there is provided apparatus for heating a product, the product being contained in a single-serving film bag, comprising: a strainer, a pot disposed below the strainer, a conveyor, the conveyor including means for positqioning the film bag above the strainer, means for immobilizing the film bag above the strainer, means for opening the film bag whereby the product falls into the strainer, means for lowering the strainer into the pot, means for injecting hot water into the pot, the means for injecting including a ring having means for producing a plurality of inward-directed jets of hot water, means for sealing a bottom of the pot whereby the hot water is retained in the pot, means for raising the strainer from the pot after a predetermined heating period, means for releasing the product from the strainer onto a container, and means for draining the pot after the predetermined heating period.

According to a still further feature of the invention, there is provided apparatus for heating and dispensing a sauce comprising: a sauce reservoir, means for pressurizing the sauce reservoir, conduit means for permitting the sauce to be urged from the reservoir by the means for pressurizing, means for heating at least a portion of the sauce in the conduit means, means for sealing a downstream end of the conduit means, and means for opening the downstream end for dispensing of the at least a portion of the sauce heated in the means for heating.

According to a still further feature of the invention, there is provided a method for heating a product, the product being contained in a single-serving film bag, comprising: conveying the single-serving film bag to a position over a strainer, immobilizing the film bag above the strainer, opening the film bag whereby the product falls into the strainer, lowering the strainer into a pot, injecting a plurality of inward-directed jets of hot water into the pot, impinging at least some of the jets of hot water on the strainer whereby the hot water is forcibly entered into the strainer and into contact with the product, sealing a bottom of the pot whereby the hot water is retained in the pot, raising the strainer from the pot after a predetermined heating period, releasing the product from the strainer onto a container, and draining the pot after the predetermined heating period.

According to a still further feature of the invention, there is provided a method for heating and dispensing a sauce comprising: pressurizing a sauce reservoir with a gas pressure, permitting the sauce to be urged from the reservoir through a conduit by the pressure, heating at least a portion of the sauce in the conduit, sealing a downstream end of the conduit, and opening the downstream end for dispensing of the at least a portion of the sauce heated in the conduit.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

One skilled in the art will recognize that the invention described below can be adapted for use with many other types of food articles. For concreteness of description, however, the following disclosure employs a spaghetti with a fluid spaghetti sauce as the environment within which the invention is embedded. The entire combination including the treatment of the spaghetti and the spaghetti sauce may be considered as well as the sub-combinations thereof should be recognized. For convenience, an automatic coin-operated device is assumed at the point of sale. Manual control and dispensing at the point of sale are equally within the contemplation of the invention.

Figure 1:
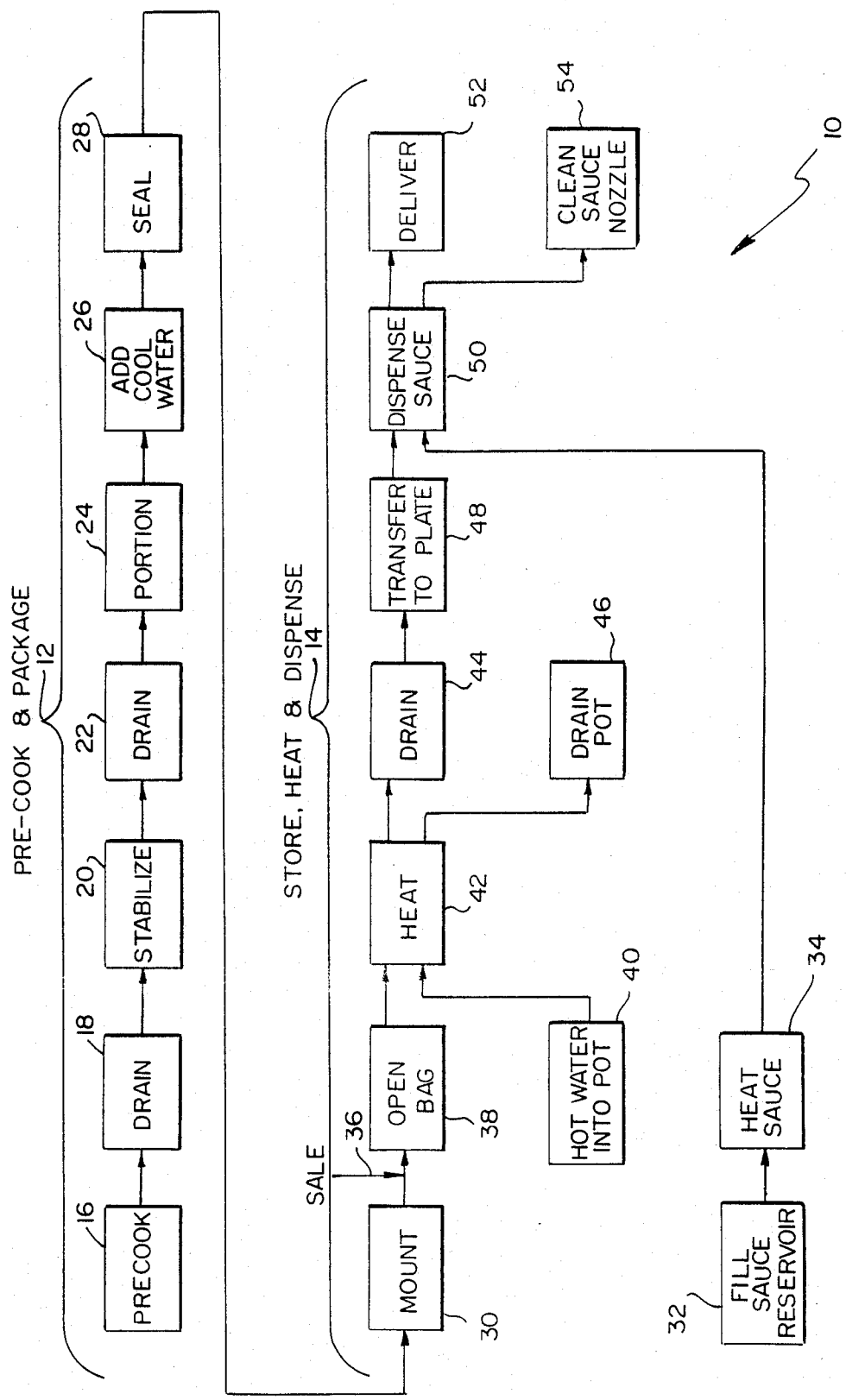
FIG. 1 is a functional diagram of a sequence of operations for pre-cooking, packaging, and dispensing a pasta product.

Referring to FIG. 1, there is shown, generally at 10, a functional flow of a spaghetti preparation sequence according to an embodiment of the invention. The functional flow is divided into a pre-cook and package portion 12 and a store, heat and dispense portion 14. In the preferred embodiment, pre-cook and package portion 12 takes place in a manufacturing facility and store, heat and dispense portion 14 takes place in a vending apparatus according to an embodiment of the invention. For clarity, the entire functional flow of spaghetti preparation sequence 10 is discussed and then the apparatus employed to accomplish the functions in store, heat and dispense portion 14 are detailed.

Spaghetti is prec-ooked in boiling water for a predetermined period in a precook operation 16. Precooking time is reduced over that which would otherwise be required in order that the serving of completely spaghetti finally dispensed shall have the required properties. The precooked spaghetti is drained in a drain operation 18 and then is stabilized by immersing in cool water in a stabilize operation 20. The cool water is drained from the spaghetti in a second drain operation 22. The stabilized and drained spaghetti is portioned into single-serving containers in a store, heat and dispense portion 14. A measured amount of cool water is added to each portion in an add-water operation 26. The final function in pre-cook and package portion 12 is sealing the single-serving container in a sealing operation 28.

It is the purpose of pre-cook and package portion 12 to produce an output which, after normal a package-storage time, may be rapidly cooked to a flavor and texture comparable to the finest freshly cooked spaghetti. I discovered that, following sealing operation 28, spaghetti continues to absorb moisture. It is thus necessary to limit the time in precook operation 16, and hence the amount of moisture absorbed in that operation, so that, the total amount of water absorbed by the time the spaghetti is sold closely approximated the amount that is absorbed in a complete fresh preparation. Conventional spaghetti preparation requires boiling for from about 7 to about 10 minutes depending on the texture desired. Precook operation 16 is terminated at four minutes and drain operation 18 is performed immediately. Stabilize operation 20 is then performed to cool the spaghetti rapidly in order that positive termination of cooking is accomplished without additional cooking from internally stored heat.

After draining in drain operation 22, I dispense about eight ounces of spaghetti into each single-serving container in add-water operation 26. In add-water operation 26, I add sufficient cool water to prevent the spaghetti from becoming sticky an a small enough amount so that, when the package is opened at the time of sale, substantially all of the water added in this operation has been absorbed by the spaghetti. With one brand of semolina spaghetti, the amount of water added to eight ounces of spaghetti in sealing operation 28 is preferably about two ounces. After a short time, only a few drops of unabsorbed or adsorbed water remains in the package. Other types of spaghetti, and other variables which may later be discovered, could require changing the proportion of cool water to spaghetti added in this operation.

The functions performed in sealing operation 28 depend on the type of packaging used. In the preferred embodiment, a plastic film bag such as, for example, a polyethylene, polypropylene or volyvinyl chloride film bag, is employed for the container. In this embodiment, sealing operation 28 preferably seals a seam across the bag above the contents. In a most preferred embodiment, a conventional bag-forming, sealing and separating machine (not shown) operates on a plastic tube to seal the top of a filled bag, seal the bottom of the next bag and separates the filled bag from the next bag in a single operation.

I have found it convenient in some instances to employ an intermediate container (not shown) in add-water operation 26 for receiving the single servings of spaghetti and the added water. The single servings are then transferred into the final package. When plastic film bags are used, this technique permits improved control of the spaghetti and water as it is added to the film bag. In this manner, it is easier to prevent moistening the film bag in the region where a sealing operation is to be performed. The intermediate container may conveniently be part of a weighing apparatus employed in measuring the single-serving quantity.

Store, heat and dispense portion 14 begins with mounting the single-serving containers produced in pre-cook and package portion 12 on a dispenser in a package-mounting operation 30 where they remain until sold one by one. A parallel chain of operations in store, heat and dispense portion 14 provide a heated spaghetti sauce for dispensing at the appropriate time. A sealed sauce reservoir is preferably filled in a fill-sauce-reservoir operation 32 at the same time that package-mounting operation 30 is performed. A single serving of sauce is heated in a sauce-heating operation 34 and is preferably maintained at the serving temperature until dispensed.

All operations remain as described above until a sale is made, as indicated by an arrow 36. Immediately after a sale, one single-serving container is opened into a strainer in a package-opening operation 38 and a measured amount of hot water is added to a pot in a hot-water-dispensing operation 40. The strainer containing the spaghetti is lowered into the pot to accomplish a heating operation 42. After a predetermined cooking time the strainer is raised from the pot to accomplish a drain operation 44. The used water in the pot is drained in a drain pot operation 46 whereby each time a serving of spaghetti is prepared, a fresh supply of hot water is used.

The drained spaghetti is transferred to a plate in a transfer operation 48. Then the sauce, maintained heated in sauce-heating operation 34 is dispensed over the spaghetti in the plate in a sauce-dispensing operation 50. The prepared plate is delivered to a buyer in a delivery operation 52.

During all operations preceding sauce-dispensing operation 50, the spaghetti sauce remains sealed in a hygienic, non-oxidizing environment. Sauce-dispensing operation 50 requires dispensing a portion of sauce through a nozzle outside the sealed environment. For hygienic reasons, the nozzle is cleaned in a nozzle cleaning operation 54 following each sauce-dispensing operation 50.

The preparation in pre-cook and package portion 12, plus additional water absorption in the single-serving container, leaves the spaghetti in exactly the moisture condition required for dispensing. Thus, heating operation 42 need endure only long enough to raise the temperature of the spaghetti to serving temperature. Using a hot-water temperature of about 200 degrees F. and special handling techniques to be described, I have discovered that ten ounces of spaghetti (eight ounces plus two ounces of water) can be raised to a satisfactory serving temperature in about 10 seconds. Allowing adequate time for each operation permits an elapsed time from sale to delivery of about 30 seconds. The delivered product has all of the flavor and texture properties of freshly cooked spaghetti, and the process makes full provision for sanitary and hygienic handling of food products.

I have discovered that the sealed film bags keep the product fresh for at least two weeks without the addition of preservatives. Further extension in storage time to several months may be attainable using nuclear sterilization of the package contents after sealing.

Figure 2:
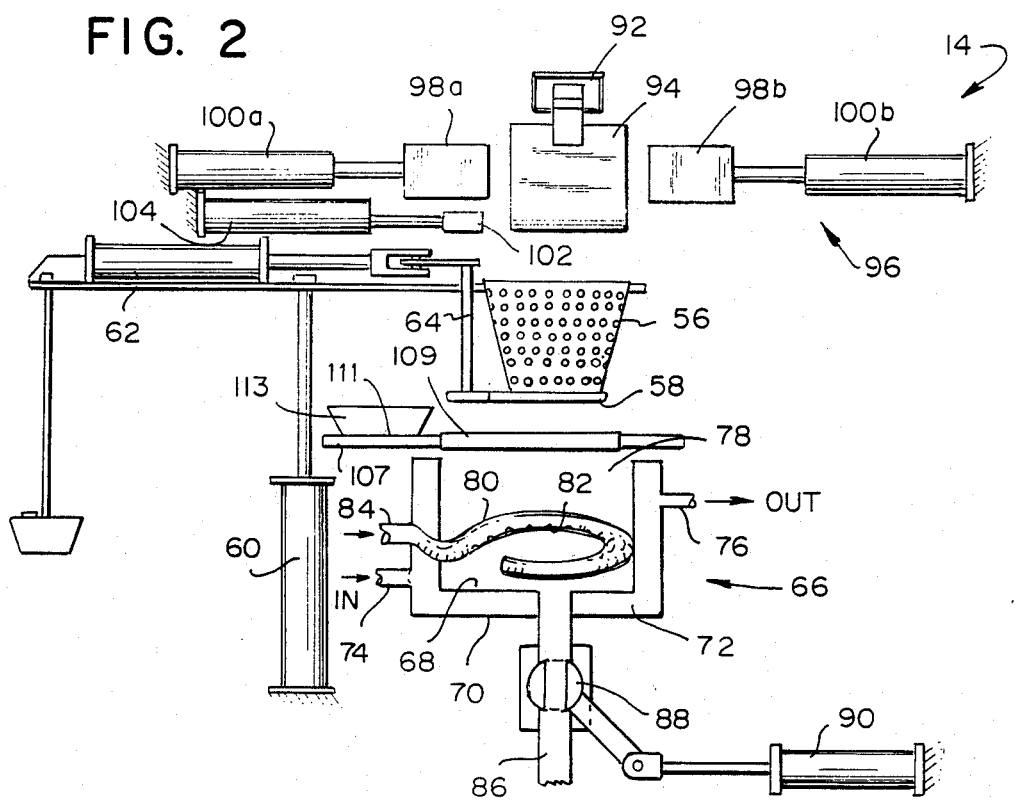
FIG. 2 is a simplified schematic diagram of apparatus for accomplishing the store, heat and dispense portion of FIG. 1.

Referring now to FIG. 2, there is shown a part of the apparatus for accomplishing store, heat and dispense portion 14. A strainer 56, closeable at its bottom by a rotatable perforated flap 58, is supported in a predetermined vertical position by a linear actuator 60 such as, for example, a pneumatic or hydraulic cylinder. A flap-control linear actuator 62 controls the position of rotatable perforated flap 58 through a shaft 64.

A double-walled pot, shown generally at 66, includes an inner wall 68 and an outer wall 70 defining a flow chamber 72 therebetween. Hot water, preferably at about 200 degrees F., continuously circulates through flow chamber 72, entering through an inlet 74 and exiting through an outlet 76. Inner wall 68 defines a pot volume 78 whose surfaces are maintained at about 200 degrees F. by the water circulating through flow chamber 72.

A pot volume 78, defined by inner wall 68, includes a perforated water-delivery ring 80 disposed substantially above a bottom of pot volume 78. A diameter of perforated water-delivery ring 80 is large enough to permit the passage of strainer 56 therethrough. A plurality of inward-directed perforations 82 spaced about perforated water-delivery ring 80 deliver hot water at about 200 degrees F. received through a hot-water inlet 84. A waste-water drain 86 communicates with a bottom of pot volume 78. A waste-water control valve 88 in waste-water drain 86 controls the flow of waste water under control of a waste water control actuator 90.

A conveyor 92 supports a plurality of spaghetti bags 94, bringing the leading one thereof into the operative position shown. A bag clamp 96, made up of U-shaped clamp halves 98a and 98b and linear actuators 100a and 100b are positioned on opposed sides of the leading spaghetti bag 94. A bag-slitting knife 102, and an associated linear actuator 104, are disposed at one side of the leading spaghetti bag 94 near the bottom thereof.

Figure 3:
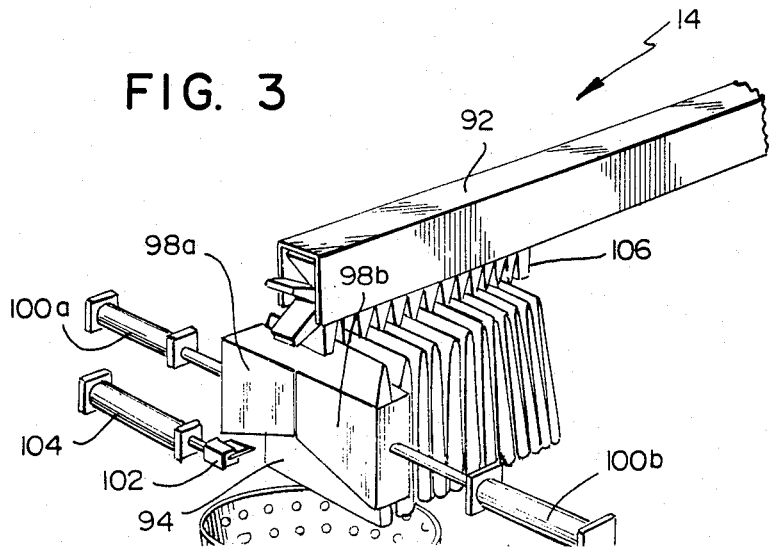
FIG. 3 is a perspective view of a portion of the apparatus of FIG. 2.

Referring momentarily to the perspective view in FIG. 3, a linear embodiment of conveyor 92 includes a plurality of clips 106, each of which is capable of supporting a spaghetti bag 94 and conveying it toward the operative position. According to the timing of store, heat and dispense portion 14, U-shaped clamp halves 98a and 98b are urged into an embracing position about the leading spaghetti bag 94 by their related linear actuators 100a, and 100b, respectively, whereby the leading spaghetti bag 94 is tightly grasped therebetween. At a further time in the timing of store, heat and dispense portion 14, bag-slitting knife 102 is urged by linear actuator 104 along a bottom of the leading spaghetti bag 94 whereby a cutting edge of bag-slitting knife 102 opens a slit along a substantial part of the bottom of the leading spaghetti bag 94. The spaghetti within the leading spaghetti bag 94 falls into strainer 56 for heating and additional operations as will be described.

After the spaghetti in the leading spaghetti bag 94 is released into strainer 56, linear actuators 100a and 100b retract U-shaped clamp halves 98a and 98b, respectively, thereby clearing the empty bag. Conveyor 92 is actuated to advance one position. As the clip 106 holding the empty bag moves forward, it automatically releases the empty bag which is then conveyed to a trash container. One convenient and positive way for conveying the empty bag to a trash container includes disposing a vacuum hose (not shown) closely adjacent the operative position. A vacuum is drawn in the vacuum hose as the empty bag is advanced to the release point, whereby the empty bag is removed to the trash container (not shown). The next spaghetti bag 94 advancing to the operative position remains unaffected by the vacuum due to the weight of moist spaghetti therein.

A rotatable table 107 includes an opening 109 therein aligned below strainer 56 in the condition shown in FIG. 2. Rotatable table 107 includes a surface 111 upon which a serving container 113 may be placed for use in a stage in the operation following that depicted in FIG. 2.

Figure 4:
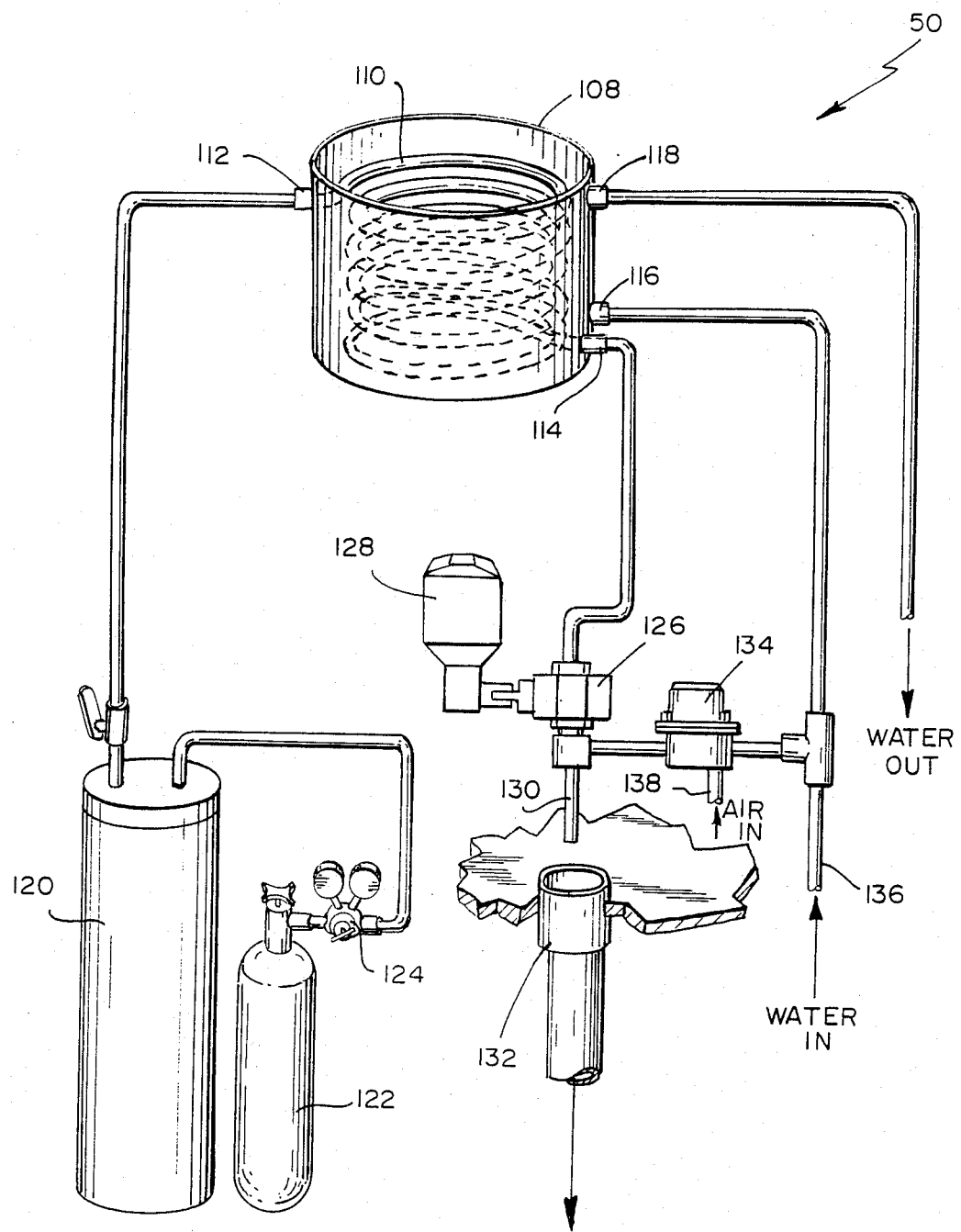
FIG. 4 is a schematic perspective view of apparatus for accomplishing the sauce-dispensing operation of FIG. 1.

Referring now to FIG. 4, an apparatus to carry out sauce-dispensing operation 50 is shown. A heat-exchanger tank 108 contains a coiled tube 110 (shown in dashed line) therein. Coiled tube 110 sealingly connects a sauce inlet 112 and a sauce outlet 114. A hot-water inlet 116 and a hot-water outlet 118 permit hot water at about 200 degrees F. to circulate through the interior of heat-exchanger tank 108 in contact with the exterior of coiled tube 110 whereby heat is transferred to the contents of coiled tube 110. A spaghetti-sauce reservoir 120 is maintained under a positive pressure of a gas fed from an inert tank 122. The value of positive pressure is controlled by a conventional pressure regulator 124. Any convenient type of pressurizing gas may be employed such as, for example, air. In a more preferred embodiment, an inert gas such as, for example, a dry nitrogen gas is employed in inert tank 122 since such an inert gas does not react with the spaghetti sauce in spaghetti-sauce reservoir 120.

A sauce-control valve 126, controlled by a sauce-valve actuator 128 controls the delivery of sauce to a sauce nozzle 130. A drain 132 catches excess effluent from sauce-control valve 126 for conveyance to a waste container. In normal operation, a plate carrying a serving of spaghetti is interposed between sauce nozzle 130 and drain 132 whenever sauce is dispensed. Thus, in the absence of a malfunction causing failure of a plate to appear at the appropriate time, sauce is not dispensed directly into drain 132.

For cleanliness, it is desirable that sauce nozzle 130 be cleaned after every use. For this purpose, a water-purge valve 134 admits a cleansing purge flow of water from a circulating water line 136 to sauce nozzle 130 for a short following the end of sauce delivery. In some environments, it may be desirable to dry the water and sauce residue from sauce nozzle 130 after the water-purge operation is completed. For this purpose an air-purge line 138 may provide a supply of compressed air from any convenient source to water-purge valve 134. Upon completion of the water purge, water-purge valve 134 admits a blast of pressurized air to sauce nozzle 130 for completing the purging thereof. Water-purge valve 134 is shown as a single valve for controlling both hot water and compressed air. If desired, separate valves may be provided for controlling the two cleaning media.

The gauge and length of coiled tube 110 is preferably selected to contain about one serving of sauce. In the preferred embodiment, about a six-ounce serving is contained in an 18-foot length of ⅜th inch plastic tubing. Any convenient type of tubing including metal and plastic which is compatible with the serving of an acidic food product is satisfactory for coiled tube 110. I have discovered that a fluorocarbon sold under the trademark Teflon is especially suitable for this use.

From the preceding, it will be recognized that, except for sauce being dispensed, all of the spaghetti sauce is sealed behind sauce-control valve 126. Thus, the pungent aroma normally accompanying heated spaghetti sauce is retained inside the apparatus until a serving of sauce is actually dispensed. This avoids dissipating the flavor and aroma of the sauce and keeps the vicinity of the apparatus free from excessive odors.

Figure 5:
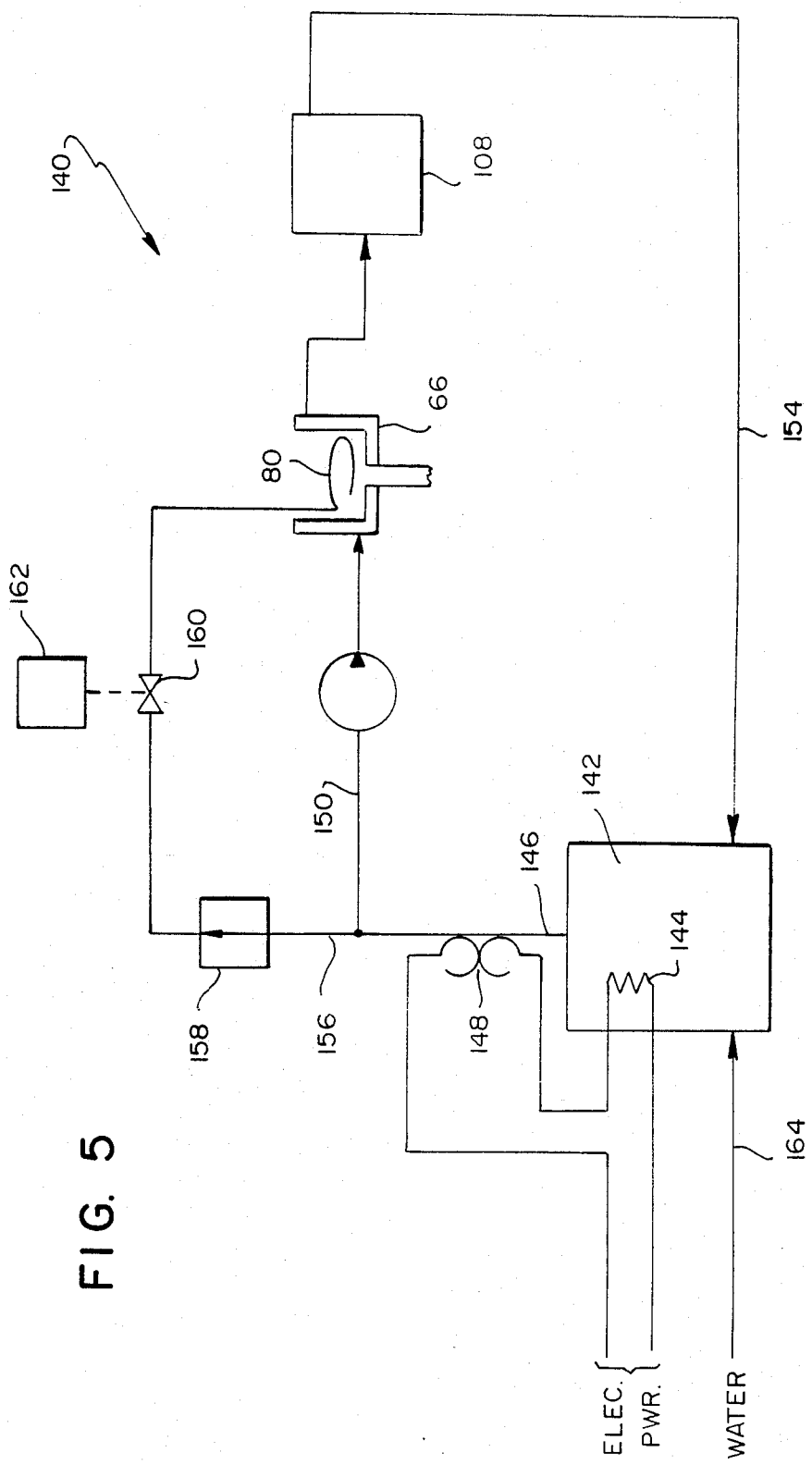
FIG. 5 is a schematic diagram of a water flow system according to an embodiment of the invention.

Referring now to FIG. 5, a water flow system 140 for the invention is shown. A water heater 142 includes a heating element 144 therein. A water outflow line 146 has a thermostat 148 in thermal contact therewith. Thermostat 148 is disposed in series with an electric power supply to heating element 144. A branch line 150 from water outflow line 146 is connected to an inlet of a hot-water circulation pump 152. As shown, hot water from hot-water circulation pump 152 passes in series through double-walled pot 66 and heat-exchanger tank 108 before being returned to the bottom of water heater 142 on a return line 154.

A second branch line 156 from water outflow line 146 is connected to an inlet of a pressure regulator valve 158. An outlet of pressure regulator valve 158 is connected to a water-control valve 160. The outlet of water-control valve 160 is connected to perforated water-delivery ring 80. A valve controller 162 is responsive to appropriate system timing signals for supplying hot water at a pressure determined by pressure regulator valve 158 to perforated water-delivery ring 80. A water supply line 164 maintains a supply pressure in water heater 142 and replenishes water used in the spaghetti-heating operation.

Hot-water circulation pump 152 preferably runs continuously whereby double-walled pot 66 and heat-exchanger tank 108 are maintained at a continuous elevated temperature. Placement of thermostat 148 in contact with the outlet of water heater 142 ensures that the water circulating in water flow system 140 and the water delivered to perforated water-delivery ring 80 are at a predetermined temperature established by the setting of thermostat 148. In the preferred embodiment, this predetermined temperature is about 200 degrees F.

It will be recognized that continuous circulation and control of the outlet temperature imposes substantial heating requirements on water heater 142. I have discovered that, in order to maintain the desired water temperature during periods of heavy use, a 50-gallon water heater 142 requires a heating power of about 9 kilowatts in heating element 144. It should also be recognized that any convenient heating source may be substituted for heating element 144 without departing from the scope of the invention. For example, gas- or coal- fired versions may be employed. Alternatively, if a supply of steam is available, a suitable steam-to-water heat exchanger (not shown) may be substituted for water heater 142.

Figure 6:
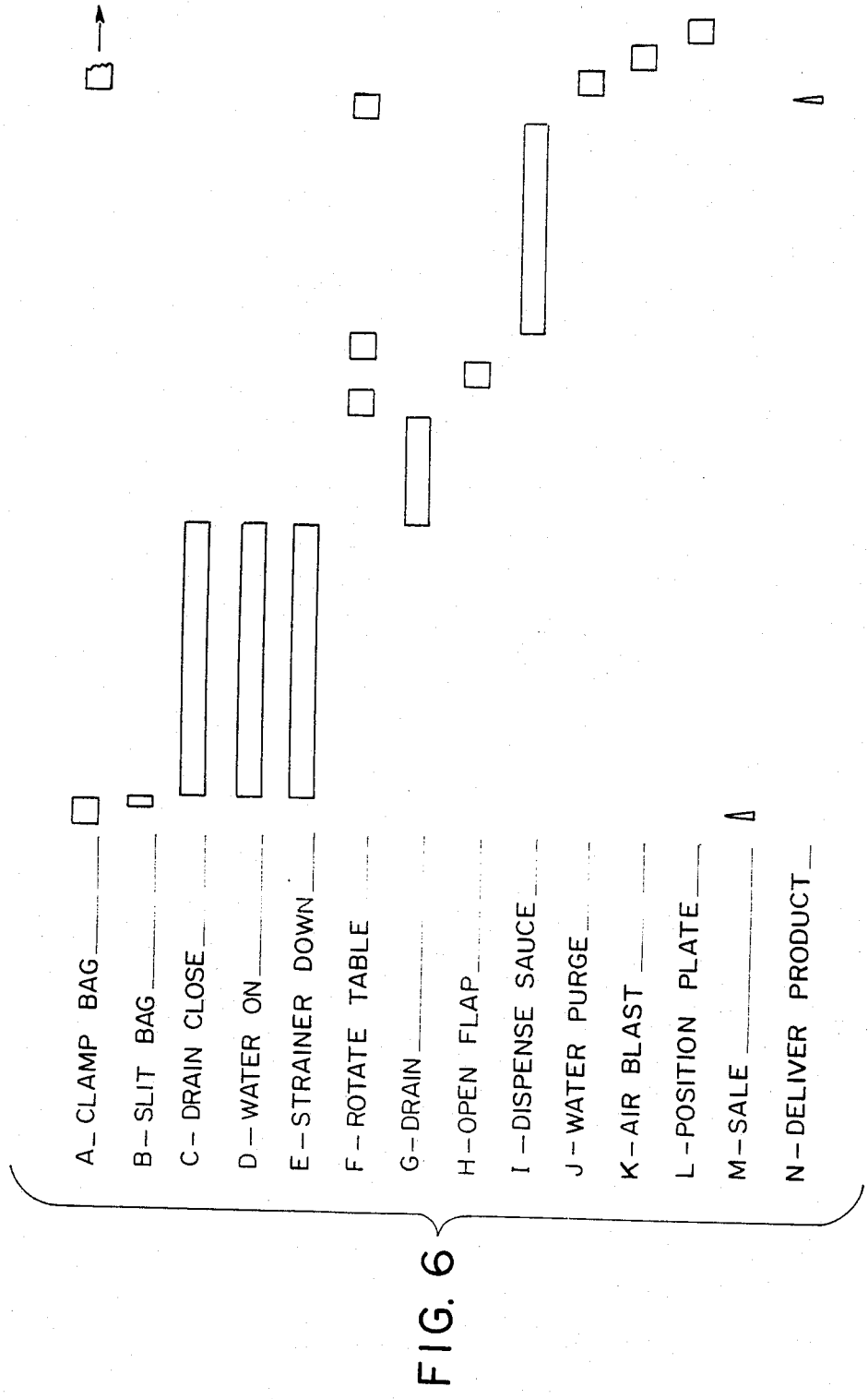
FIG. 6 is a Gantt chart showing the time relationships between the functions performed in heating and dispensing a pasta product according to an embodiment of the invention.

Referring to the Gantt chart in FIG. 6 in conjunction with the apparatus of FIGS. 2–5, the sequence of operation of the apparatus is explained. As indicated in line A of FIG. 6, bag clamp 96 (FIGS. 2 and 3) is actuated to clamp the leading spaghetti bag 94 at the end of the preceding sequence and remains in that condition until a sale (line M of FIG. 6) occurs. At the instant a sale is made, linear actuator 104 is actuated to draw bag-slitting knife 102 along the bottom of the leading spaghetti bag 94 (FIGS. 2 and 3) whereby the moist spaghetti in spaghetti bag 94 drops into strainer 56, which is in its elevated position at this time.

Immediately following the slitting of spaghetti bag 94, waste water control actuator 90 closes waste-water control valve 88 (FIG. 2), valve controller 162 opens water-control valve 160 (line D of FIG. 6 and FIG. 5) thereby permitting hot water to flow through perforated water-delivery ring 80 into double-walled pot 66, and strainer 56 is lowered rapidly into double-walled pot 66 (line E of FIG. 6) by actuation of linear actuator 60 (FIG. 2). As strainer 56 is lowered through perforated water-delivery ring 80, inward-directed jets of water formed by inward-directed perforations 82 penetrate through the foramina of strainer 56 thereby beginning to apply hot water to the spaghetti in strainer 56 even before strainer 56 reaches its lowermost position in double-walled pot 66. Once strainer 56 has reached its lowermost position in double-walled pot 66, the inward-directed jets formed by inward-directed perforations 82 continue to force hot water into the interior of strainer 56 as double-walled pot 66 fills. Besides early delivery of hot water to the spaghetti, forcible water jets create a substantial turbulence within strainer 56 which further reduces the time required for raising the spaghetti to serving temperature. Preheating inner wall 68 (FIG. 2) of double-walled pot 66 by continuously flowing hot water through flow chamber 72 further ensures that rapid heating is accomplished.

Although the spaghetti-heating time represented by lines C, D and E in FIG. 6 may vary for different types and serving quantities of spaghetti, I have found that a 10-ounce serving of spaghetti prepared in the manner described in the foregoing is raised to serving temperature in from about 8 to about 15 seconds.

At the end of the spaghetti-heating period, waste-water control valve 88 (FIG. 2) is opened, water-control valve 160 (FIG. 5) is closed, and strainer 56 is raised to the upper position shown in FIG. 2. Strainer 56 is maintained in the raised position for a drain period (line G of FIG. 6) lasting a few seconds. At the end of the drain period, rotatable table 107 (FIG. 2) is rotated (line F of FIG. 6) to position serving container 113 directly below strainer 56. Rotatable perforated flap 58 is rotated (line H of FIG. 6) to deposit the heated and drained serving of spaghetti on serving container 113.

Rotatable table 107 is again rotated (line F of FIG. 6) to align the spaghetti in serving container 113 below sauce nozzle 130 (FIG. 4). Spaghetti sauce is dispensed (line I of FIG. 6) by actuation of sauce-control valve 126 by control signals fed to sauce-valve actuator 128. Sauce delivery is continued for a time effective to dispense a predetermined amount of sauce. In the preferred embodiment, a sauce pressure and sauce delivery time are selected effective for delivering about six ounces of spaghetti sauce.

During the above rotation, bag-slitting knife 102 is retracted by linear actuator 104, rotatable perforated flap 58 retracts to closed position, and the source of disposal vaccum (not shown) is energized. Conveyor 92 advances to release empty spaghetti bag 94 which is carried to a watse-disposal container by the vacuum, and the leading filled spaghetti bag 94 is moved forward into the dispsensing position. Bag clamp 96 is actuated to capture and hold the new leading spaghetti bag 94.

After the spaghetti sauce is dispensed, rotatable table 107 is rotated for a third time (line F of FIG. 6) to move serving container 113 into a position (not shown) where it can be picked up by the purchaser (line N of FIG. 6). This last rotation clears the bottom of sauce nozzle 130 in preparation for a water purge (line J) and an air blast (line K of FIG. 6) into sauce nozzle 130 from water-purge valve 134.

During, or following, the foregoing operations, conveyor 92 has moved the leading spaghetti bag 94 into position in preparation for the next sequence of operations. At this time, bag clamp 96 is actuated to capture and hold the leading spaghetti bag 94 (line A of FIG. 6). In addition, a serving container 113 is positioned on rotatable table 107 (line L of FIG. 6) in preparation for the next sequence.

Any convenient apparatus may be employed for generating control signals to satisfy the sequence illustrated in FIG. 6. For example, mechanical cams operating electrical switches are satisfactory. In addition, an embodiment of the invention employing electronic generation of control signals is contemplated. For example, a microprocessor driven by a suitable program may be employed for generating all timing and control signals required by the apparatus. Execution of commands embodied in control signals may be performed by electrical, electro-hydraulic or electro-pneumatic devices without departing from the spirit and scope of the invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What I claim is:

1. Apparatus for heating a product comprising:
   a pot;
   a strainer for containing said product;
   means for lowering said strainer into said pot;
   a water-delivery ring in said pot;
   said water-delivery ring being positioned a substantial distance above a bottom of said pot and having an opening sufficient to permit said strainer to pass at least part-way therethrough; and
   said water-delivery ring including means for producing inward-directed water jets of hot water for impingement upon and into said strainer whereby said product in said strainer is contacted by said hot water.

2. Apparatus according to claim 1 wherein said pot includes an outer wall and an inner wall with a flow chamber therebetween, and means for flowing hot water through said flow chamber whereby said pot is maintained in a heated condition.

3. Apparatus according to claim 1, further comprising:
   a waste-water drain in said pot;
   a waste-water control valve effective for controlling a flow of water through said waste-water drain;
   means for closing said waste-water control valve in timed relationship to lowering of said strainer into said pot whereby said water is retained in said pot for heating said product; and
   means for opening said waste-water control valve upon completion of heating said product whereby said water therein is discharged.

4. Apparatus according to claim 1, further comprising:
   a flap in a bottom of said strainer;
   said means for lowering further including means for raising said strainer from said pot; and
   means for opening said flap whereby said product is discharged therefrom.

5. Apparatus according to claim 1, further comprising:
   means for discharging said pasta product from said strainer onto a container;
   means for heating a serving of a sauce; and
   timed means for dispensing said serving of a sauce onto said pasta product.

6. Apparatus according to claim 5 further comprising:
   said means for dispensing including a nozzle; and
   means for cleaning said nozzle after completion of said dispensing.

7. Apparatus according to claim 6 wherein said means for cleaning includes means for injecting a purging flow of water into said nozzle.

8. Apparatus according to claim 7 wherein said means for cleaning further includes means for injecting a purging flow of air into said nozzle upon completion of said purging flow of water.

9. Apparatus for heating a product, said product being contained in a single-serving film bag, comprising:
   a strainer;
   a pot disposed below said strainer;
   a conveyor;
   said conveyor including means for positioning said film bag above said strainer;
   means for immobilizing said film bag above said strainer;
   means for opening said film bag whereby said product falls into said strainer;
   means for lowering said strainer into said pot;
   means for injecting hot water into said pot;
   said means for injecting including a ring having means for producing a plurality of inward-directed jets of hot water;
   means for sealing a bottom of said pot whereby said hot water is retained in said pot;
   means for raising said strainer from said pot after a predetermined heating period;
   means for releasing said product from said strainer onto a container; and
   means for draining said pot after said predetermined heating period.

10. Apparatus according to claim 9 wherein said means for injecting includes a dimension and a position effective for injecting at least some of said plurality of inward-directed jets of hot water into said strainer before said strainer reaches a lower position in said pot.

11. Apparatus according to claim 9 wherein said means for immobilizing includes first and second U-shaped clamp halves disposed on opposed sides of said film bag and means for urging said first and second clamp halves into engaging embrace about said film bag.

12. Apparatus according to claim 9 wherein said means for opening includes:
   a bag-slitting knife; and
   means for moving said bag-slitting knife in contact with a substantial portion of said film bag whereby said film bag is opened.

* * * * *